United States Patent
Kim et al.

(10) Patent No.: US 11,576,043 B2
(45) Date of Patent: Feb. 7, 2023

(54) SESSION MANAGEMENT METHOD AND SMF NODE

(71) Applicant: LG ELECTRONICS INC., Seoul (KR)

(72) Inventors: Hyunsook Kim, Seoul (KR); Myungjune Youn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 647 days.

(21) Appl. No.: 16/496,396

(22) PCT Filed: Dec. 26, 2017

(86) PCT No.: PCT/KR2017/015421
§ 371 (c)(1),
(2) Date: Sep. 20, 2019

(87) PCT Pub. No.: WO2018/174383
PCT Pub. Date: Sep. 27, 2018

(65) Prior Publication Data
US 2020/0053562 A1    Feb. 13, 2020

Related U.S. Application Data

(60) Provisional application No. 62/565,087, filed on Sep. 28, 2017, provisional application No. 62/474,080, filed on Mar. 21, 2017.

(51) Int. Cl.
*H04W 12/06*     (2021.01)
*H04W 12/062*    (2021.01)
(Continued)

(52) U.S. Cl.
CPC .......... *H04W 12/062* (2021.01); *H04W 8/02* (2013.01); *H04W 24/08* (2013.01); *H04W 28/06* (2013.01);
(Continued)

(58) Field of Classification Search
CPC ..... H04W 12/062; H04W 8/02; H04W 24/08; H04W 28/06; H04W 28/14;
(Continued)

(56) References Cited

U.S. PATENT DOCUMENTS

2011/0004762 A1*  1/2011  Horn ............... H04W 12/04
                                                  713/171
2017/0318450 A1* 11/2017  Salkintzis ......... H04W 60/06
(Continued)

OTHER PUBLICATIONS

PCT International Application No. PCT/KR2017/015421, International Search Report dated Mar. 26, 2018, 4 pages.
(Continued)

*Primary Examiner* — Syed Ali
(74) *Attorney, Agent, or Firm* — Lee, Hong, Degerman, Kang & Waimey PC

(57) ABSTRACT

One disclosure in the present specification provides a session management method performed by a session management function (SMF) node. The session management method may comprise: a step of transmitting, to a user plane function (UPF) node, a request message for discarding traffic buffering, when a notification of the detection of particular traffic associated with a wireless device has been received, and if additional authentication is required for the particular traffic; and a step of transmitting a message for triggering the wireless device to establish a new packet data unit (PDU) session, to an access and mobility management function (AMF) node.

6 Claims, 13 Drawing Sheets

(51) Int. Cl.
  *H04W 76/10*   (2018.01)
  *H04W 8/02*    (2009.01)
  *H04W 24/08*   (2009.01)
  *H04W 28/06*   (2009.01)
  *H04W 28/14*   (2009.01)
  *H04W 68/00*   (2009.01)

(52) U.S. Cl.
  CPC ......... *H04W 28/14* (2013.01); *H04W 68/005* (2013.01); *H04W 76/10* (2018.02)

(58) Field of Classification Search
  CPC ... H04W 68/005; H04W 76/10; H04W 76/15; H04W 76/22; H04W 88/14; H04W 80/10
  See application file for complete search history.

(56) References Cited

U.S. PATENT DOCUMENTS

| | | | |
|---|---|---|---|
| 2018/0167983 A1* | 6/2018 | Salkintzis | H04W 76/15 |
| 2018/0199279 A1* | 7/2018 | Baek | H04W 48/18 |
| 2018/0199398 A1* | 7/2018 | Dao | H04L 41/0806 |
| 2018/0317086 A1* | 11/2018 | Ben Henda | H04W 12/062 |
| 2018/0376446 A1* | 12/2018 | Youn | H04W 8/20 |
| 2019/0174554 A1* | 6/2019 | Deenoo | H04L 5/0048 |
| 2019/0191309 A1* | 6/2019 | Kweon | H04L 9/32 |
| 2021/0076209 A1* | 3/2021 | Suh | H04W 12/106 |

OTHER PUBLICATIONS

Oracle, et al., "Network-triggered UPF relocation for SSC mode 3 with multiple PDU sessions," SA WG2 Meeting #119, S2-171606, Croatia, Feb. 2017, 4 pages.

Sandvine Inc., "Discussion on UPF architecture and interconnection to PCF, SMF," SA WG2 Meeting #S2-119, S2-171203, Croatia, Feb. 2017, 16 pages.

Catt, "SMF and UPF interactions, SMF," SA WG2 Meeting #S2-119, S2-171155, Croatia, Feb. 2017, 4 pages.

Jungsuk Kim et al., "5G Mobility Management Technologies", OSIA S & TR Journal, vol. 29, No. 4, Dec. 2016, 21 pages.

D.Von Hugo, et al., "Review on issues in discussion of next generation converged networks (5G) from an IP point of view", draft-vonhugo-5gangip-ip-issues-02, Network Working Group, Huawei, Feb. 2017, 20 pages.

\* cited by examiner

◄- - -► Control Plane Signal

◄——► User Plane Signal

SESSION MANAGEMENT METHOD AND SMF NODE

CROSS-REFERENCE TO RELATED APPLICATIONS

This application is the National Stage filing under 35 U.S.C. 371 of International Application No. PCT/KR2017/015421, filed on Dec. 26, 2017, which claims the benefit of U.S. Provisional Application Nos. 62/474,080 filed on Mar. 21, 2017, and 62/565,087, filed on Sep. 28, 2017, the contents of which are all hereby incorporated by reference herein in their entireties.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 Shows the Configuration of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
| --- | --- |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an Exemplary Diagram Illustrating a Predicted Structure of a Next Generation Mobile Communication in Terms of a Node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication.

The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

On the other hand, in a situation where the UE roams on a visited network, for example, a V-PLMN, there are two schemes for processing a signaling request from the UE. In the first scheme, that is, LBO (local break out) scheme, the visited network handles the signaling request from the UE. According to the second scheme, that is, Home Routing (HR) scheme, the visited network transmits a signaling request from the UE to the home network of the UE.

FIG. 3A is an exemplary diagram illustrating an architecture to which a local breakout (LBO) scheme is applied when the UE is roaming; FIG. 3B is an exemplary diagram illustrating an architecture to which an HR (home routed) scheme is applied when the UE is roaming.

As shown in FIG. 3A, in the architecture to which the LBO scheme is applied, a PCF node in the VPLMN performs an interaction with an AF node to generate a PCC rule for a service in the VPLMN. The PCF node in the VPLMN creates the PCC rule based on the policy set therein according to the roaming agreement with the HPLMN provider.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 3A is an Exemplary Diagram Illustrating an Example of an Architecture for Implementing the Concept of Network Slicing.

As can be seen from FIG. 3A, the core network (CN) may be divided into several slice instances. Each slice instance may contain one or more of a CP function node and a UP function node.

Each UE may use a network slice instance corresponding to its service through RAN.

Unlike the case shown in FIG. 3A, each slice instance may share one or more of a CP function node, and a UP function node with another slice instance. This will be described with reference to FIG. 4 below.

FIG. 3B is an Exemplary View Showing Another Example of an Architecture for Implementing the Concept of Network Slicing.

Referring to FIG. 3B, a plurality of UP function nodes are clustered, and a plurality of CP function nodes are also clustered.

Further, referring to FIG. 3B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Interworking with Legacy 4th Generation Mobile Communication System>

Even if the UE leaves the coverage of the next generation RAN (Radio Access Network), the UE must be able to receive service via a 4G mobile communication system. This is called interworking. Hereinafter, interworking will be described in detail.

FIG. 4A Shows an Architecture for Interworking when the UE is not Roaming, and FIG. 4B Shows an Architecture for Interworking when the UE is Roaming.

Referring to FIG. 4A, when the UE does not roam, E-UTRAN and EPC for legacy 4th generation LTE, and 5th generation mobile communication network may be interworked with each other. In FIG. 4A, a packet data network gateway (PGW) for a legacy EPC is divided into a PGW-U, which is responsible for only the user plane, and a PGW-C, which is responsible for the control plane. Moreover, the PGW-U is merged into the UPF node of the fifth-generation core network, and the PGW-C is merged into the SMF node of the fifth-generation core network. Moreover, the Policy and Charging Rules Function (PCRF) for the legacy EPC may be merged into the PCF of the 5th generation core network. Moreover, the HSS for the legacy EPC may be merged into the UDM of the 5th generation core network. The UE may access the core network through the E-UTRAN. Alternatively, the UE may access the core network through the 5G radio access network (RAN) and the AMF.

Referring to FIGS. 4A and 4B while comparing FIGS. 4A and 4B, when the UE roams on a Visited Public Land Mobile Network (VPLMN), the data of the UE is delivered via the Home PLMN (HPLMN).

Meanwhile, the N26 interface shown in FIGS. 4A and 4B refers to an interface connected between the MME and the AMF node to facilitate interworking between the EPC and the NG core. This N26 interface may be selectively supported depending on the network operator. That is, for interworking with the EPC, the network operator may provide the N26 interface or may not provide the N26 interface.

<Next Generation UE>

The next generation UE may have a plurality of network interfaces. Each network interface can have a separate IP address. However, in this case, there is a problem that the UE cannot determine how to route outbound traffic.

In addition, for specific traffic transmitted by the next-generation UE, the network may perform an additional (i.e., secondary) authentication/authorization procedure. However, there is a problem that resources of the network can be unnecessarily wasted if additional authentication required for the transmission of specific traffic fails. In addition, there is a problem that a malicious user who finds such a problem may cause network overload by excessively transmitting traffic requiring additional authentication.

SUMMARY OF THE INVENTION

An object of the disclosures of the present specification is to solve the above-described problems.

In an aspect, a session management method performed by a session management function (SMF) node is provided. The session management method includes: transmitting, to a user plane function (UPF) node, a request message for discarding traffic buffering, when a notification of detection of a particular traffic of a wireless device is received, and when additional authentication is required for the particular traffic; and transmitting a message for triggering the wireless device to establish a new packet data unit (PDU) session, to an access and mobility management function (AMF) node.

The notification may include information indicating that additional authentication for the particular traffic is required.

The session management method may further include checking subscriber information, when a notification of detection of a particular traffic of the wireless device is received, and when additional authentication is required for the particular traffic.

The session management method may further include determining whether additional authentication is required for the specific traffic based on subscriber information when a notification of detection of a particular traffic of the wireless device is received.

The session management method may further include: receiving a request message to establish a new PDU session, from the wireless device; performing an additional authentication procedure in response to the reception; if the additional authentication is completed, recording information on whether the authentication is successful; and transmitting an acceptance message of establishment of the PDU session to the wireless device.

The session management method may further include: checking subscriber information and information on whether a previous additional authentication has been successful; and determining whether to trigger the wireless device to establish the new PDU session, based on the information on whether the previous additional authentication has been successful.

In another aspect, a session management function (SMF) node is provided. The SMF node includes: a transmission/reception unit; and a processor configured to control the transmission/reception unit, in which the processor is configured to control the transmission/reception unit to transmit, to a user plane function (UPF) node, a request message for discarding traffic buffering, when a notification of detection of a particular traffic of a wireless device is received, and when additional authentication is required for the particular traffic, and the processor is configured to control the transmission/reception unit to transmit a message for triggering the wireless device to establish a new packet data unit (PDU) session, to an access and mobility management function (AMF) node.

According to the disclosure of the present invention, the problem of the conventional technology described above may be solved.

DESCRIPTION OF EXEMPLARY EMBODIMENTS

Figure 1:
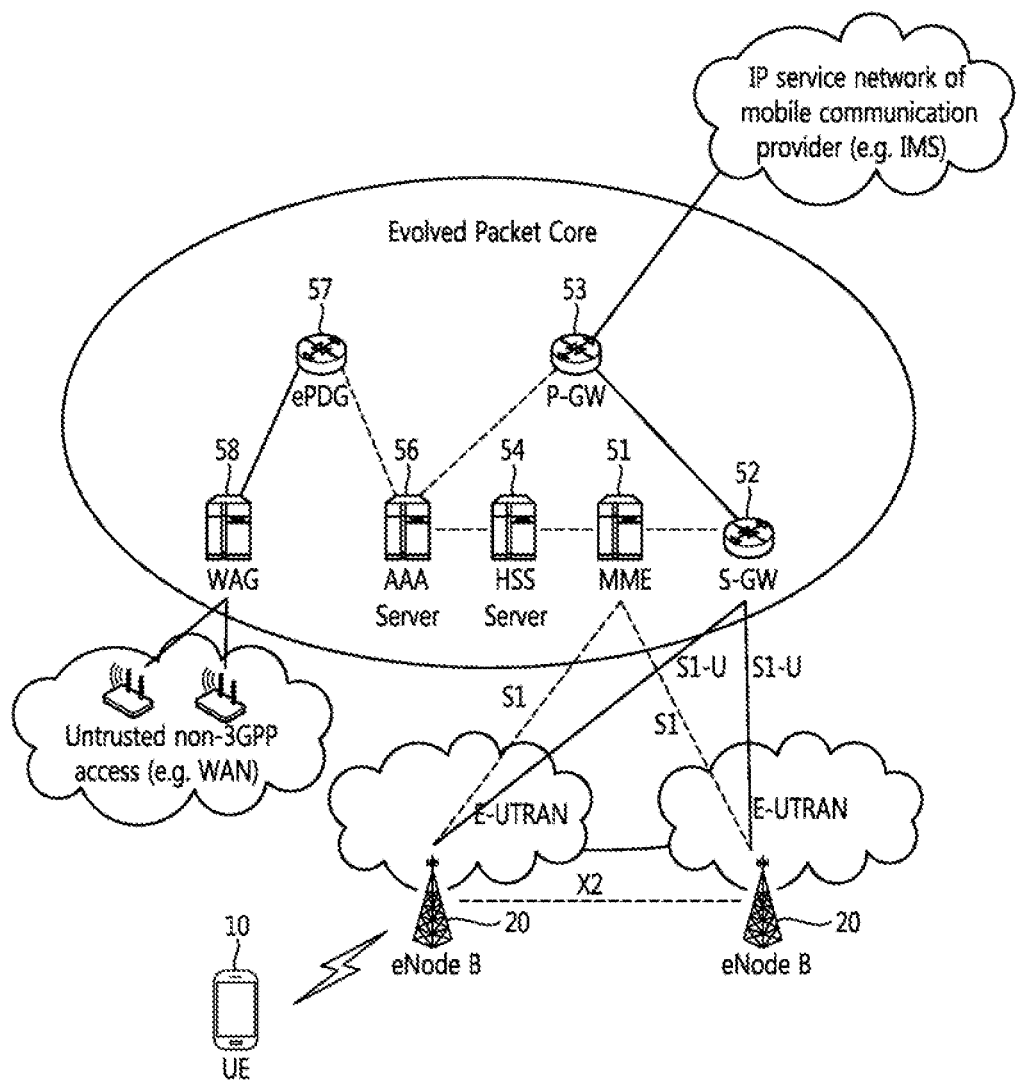
FIG. 1 shows the configuration of an evolved mobile communication network.
Figure 2:
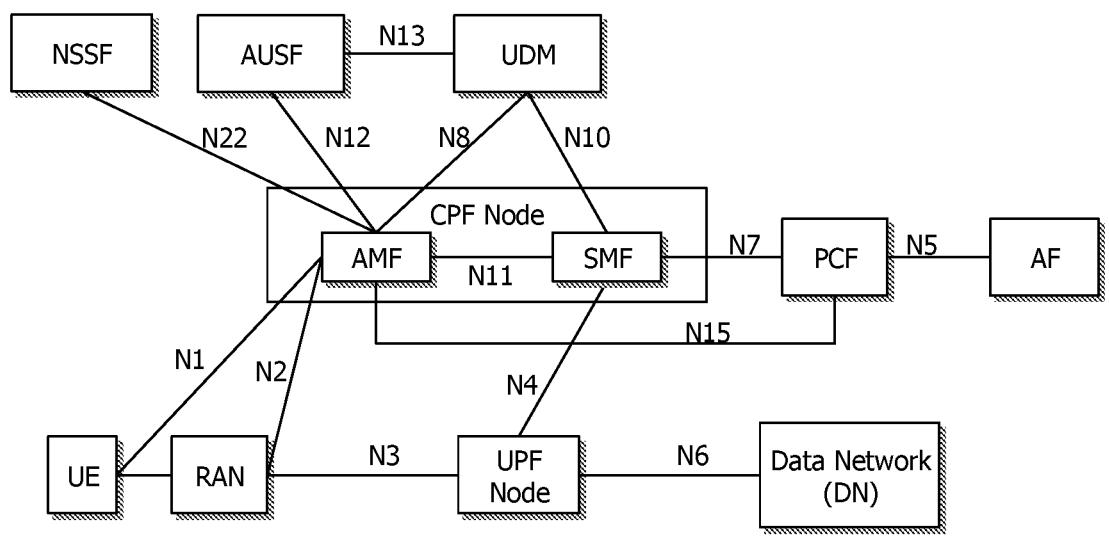
FIG. 2 is an exemplary diagram illustrating a predicted structure of a next generation mobile communication in terms of a node.
Figure 3A:
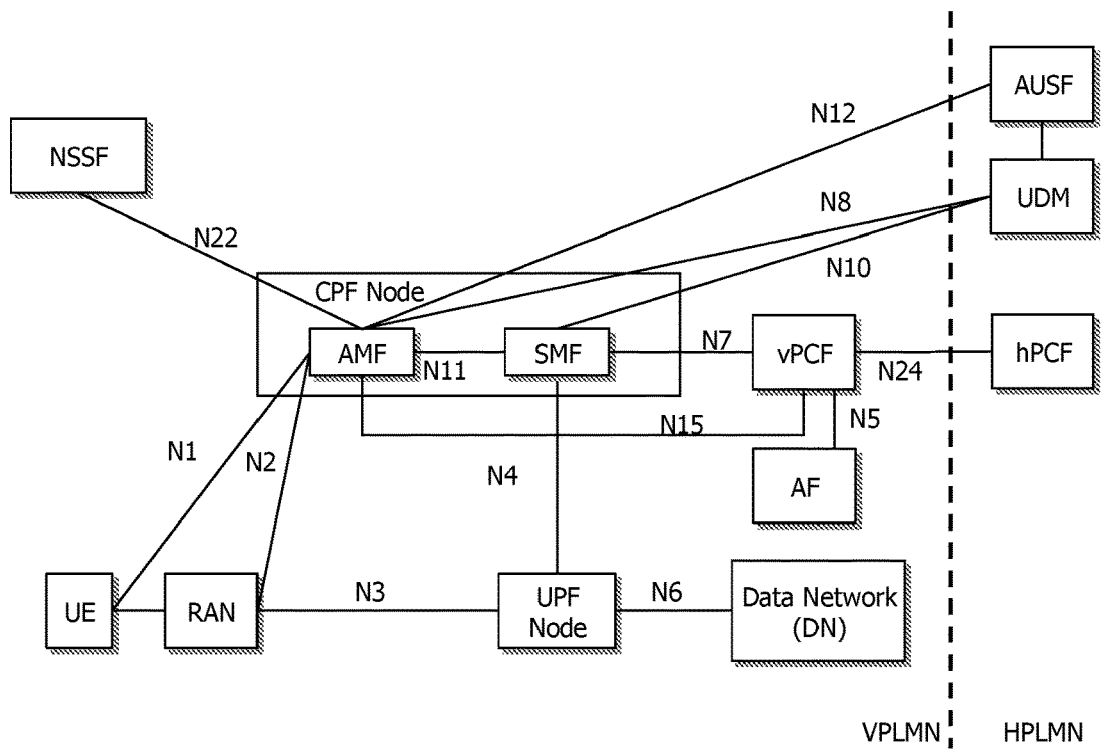
FIG. 3A is an exemplary diagram illustrating an architecture to which a local breakout (LBO) scheme is applied when roaming.
Figure 3B:
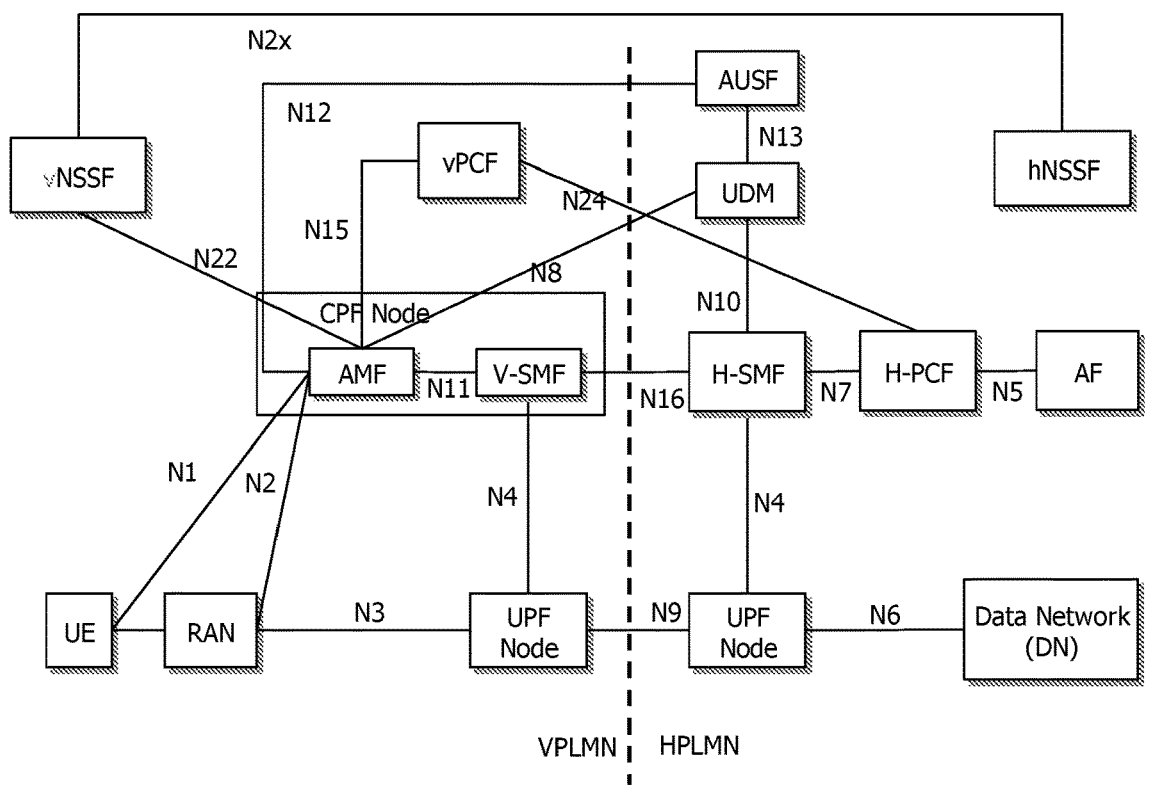
FIG. 3B is an exemplary diagram illustrating an architecture to which an HR (home routed) scheme is applied when roaming.
Figure 4A:
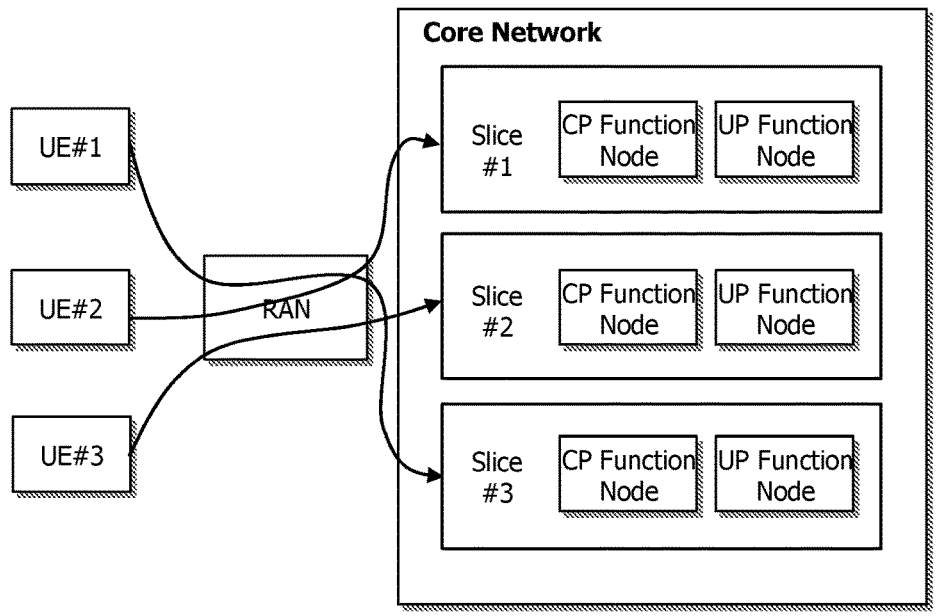
FIG. 4A is an exemplary view illustrating an example of an architecture for implementing the concept of network slicing.
Figure 4B:
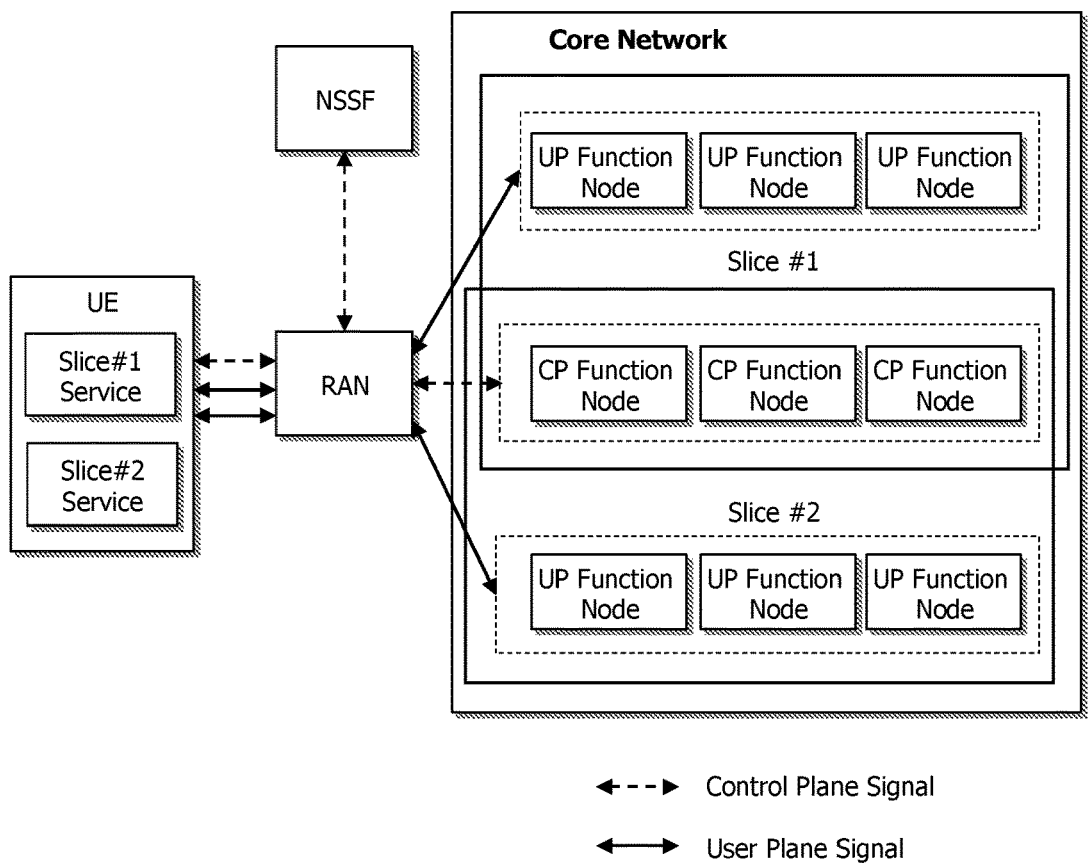
FIG. 4B is an exemplary diagram illustrating another example of an architecture for implementing the concept of network slicing.
Figure 5A:
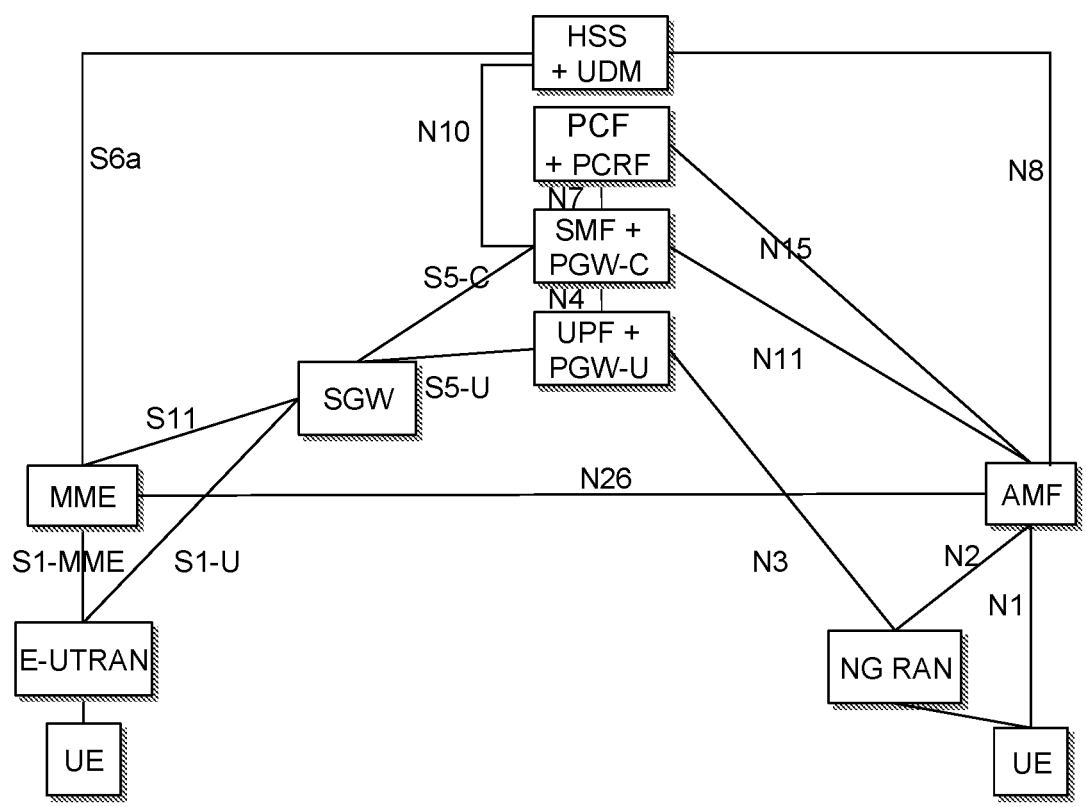
FIG. 5A shows an architecture for interworking when a UE does not roam.
Figure 5B:
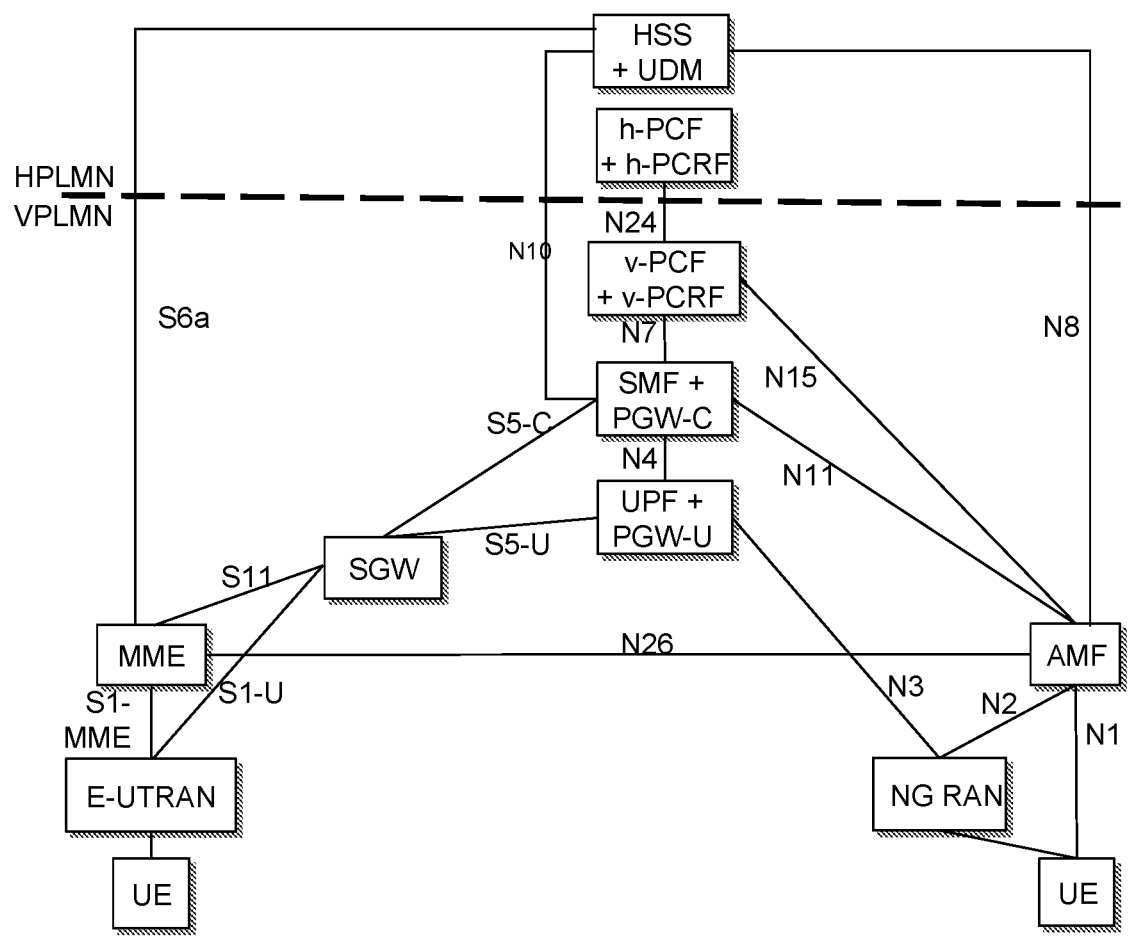
FIG. 5B shows an architecture for interworking when a UE is roaming.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A PDN connection refers to a connection from UE to a PDN, that is, an association (or connection) between UE represented by an IP address and a PDN represented by an APN.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

<Policy Information Delivered to UE>

In a next generation mobile communication system, a policy control function (PCF) node may deliver policy information to a UE. The policy information may include the following information.

1) Routing Selection Policy: This information can be used to determine how the UE should route outgoing traffic. Traffic may be routed to an established Packet Data Unit (PDU) session, or may be routed to a non-3GPP access without going through the established PDU session. Or the traffic may trigger the establishment of a new PDU session. The following policy information can be used for routing selection.

Session and Service Continuity Mode Selection (SS-CMS): This information can be used by the UE to associate its application with the Session and Service Continuity (SSC) mode, and to determine the PDU sessions to which traffic should be routed. This information can also be used to determine when to create a new PDU session using the new SSC mode.

Network Slice Selection (NSS): This information can be used by the UE to associate its application with the SM-NSSAI, and to determine the PDU sessions to which traffic should be routed. This information can also be used to determine when to create a new PDU session using the new SM-NSSAI.

Data Network Name (DNN) Selection Information: This information may be used by the UE to associate its application with one or more DNNs, and may be used to determine the PDU sessions to which traffic should be routed. This information can also be used to determine when to create a new PDU session using the new DNN.

Non-seamless Offload Policy: This information can be used to determine which traffic the UE should bypass to non-3GPP based access. If traffic is bypassed to non-3GPP based access, the sending and receiving of traffic may be temporarily interrupted.

Access type preference: This information can be used to determine which access the UE should establish a PDU session through, or which traffic should be routed to 3GPP based access or non-3GPP based access.

2) Access network discovery & selection policy (hereinafter referred to as ANDSP): This information can be used by the UE to select non-3GPP based access (e.g., Wi-Fi access). This information can also be used to detect and select non-3GPP based access so that the UE can determine its use.

The ANDSP may group several policies into one policy, for example, a UE Route Selection Policy (USRP). The URSP may include a list of URSP rules sorted according to priority. Each URSP rule may include the following components.

Traffic Filter: This filter can be used to inspect data traffic. This information may include other information than the application identifier. Traffic matched with the USRP's traffic filter may be referred to as "matched traffic".

Non-seamless bypass: It indicates whether the bypass of the matched traffic to the non-3GPP should be prohibited, preferred or allowed (i.e. not preferred but allowed).

Slice Info: This information may include the S-NSSAI required for matching traffic. In addition, the information may include, in priority order, several S-NSSAIs arranged in priority order when the matching traffic is delivered to a PDU session supporting one of several S-NSSAIs.

Continuity Type: This contains information about the SSC mode. In addition, this information may include several SSC modes arranged in priority order when the matching traffic is delivered to a PDU session supporting one of several SSC modes.

DNN: This information may include the DNN needed for matching traffic. In addition, the information may include several DNNs arranged in priority order when the matching traffic is delivered to a PDU session supporting one of several DNNs.

Access type: If the UE needs to establish a PDU session for matching traffic, this information may indicate the type of access for which the PDU session should be established (e.g., 3GPP based access or non-3GPP based access).

<Traffic Routing for Multi-Home UE>

The next generation UE may have a plurality of network interfaces. Each network interface can have a separate IP address.

Figure 6:
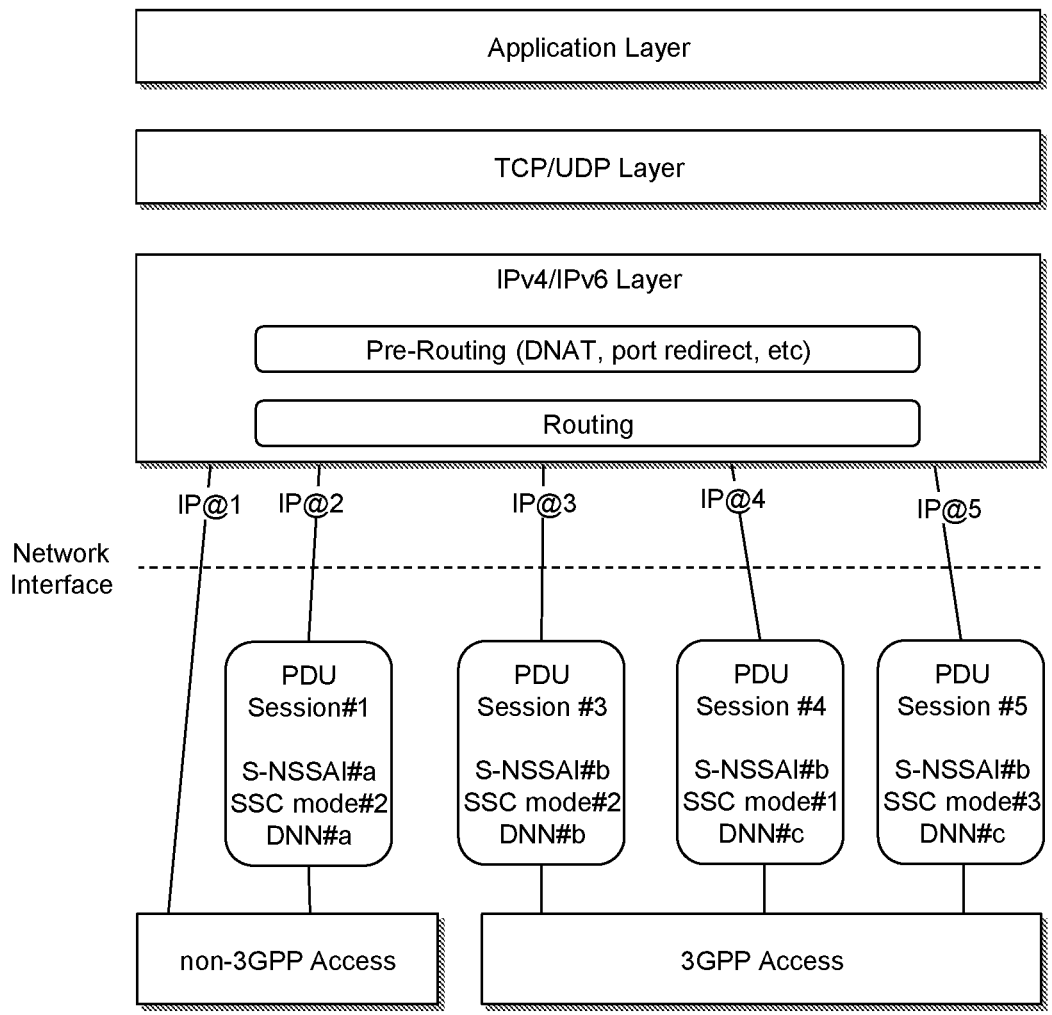
FIG. 6 is an exemplary diagram illustrating a protocol stack of a UE having a plurality of network interfaces.

FIG. 6 is an exemplary diagram illustrating a protocol stack of a UE having a plurality of network interfaces.

As can be seen with reference to FIG. 6, the network interface may have a PDU session. In this case, the UE should decide how to route outbound traffic.

However, there has been a problem that a specific scheme has not been presented.

<Disclosures of the Present Invention>

Meanwhile, according to the present disclosure, in the next generation mobile communication system, for a specific traffic transmitted by the UE, the network may perform an additional (i.e., secondary) authentication/authorization procedure. For example, when the UE transmits vehicle to vehicle (V2V) or vehicle to everything (V2X) traffic as a vehicle-mounted device, the network may perform additional authentication.

Figure 7:
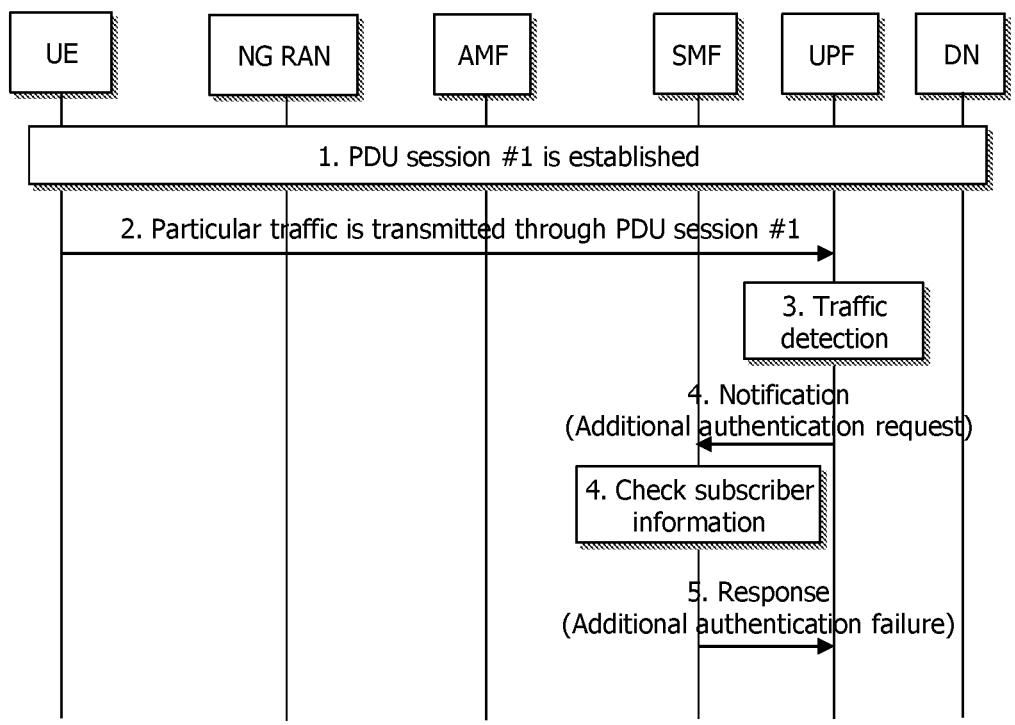
FIG. 7 illustrates an example of performing additional authentication when specific traffic is detected according to the disclosure of the present specification.

FIG. 7 illustrates an example of performing additional authentication when specific traffic is detected according to the disclosure of the present specification.

As can be seen with reference to FIG. 7, while the UE establishes PDU session #1, specific traffic is transmitted through the PDU session #1.

Then, the user plane function (UPF) detects the traffic and then analyzes the traffic. Information about the detection of the specific traffic is notified to the SMF node. The notification may include information indicating a request for further authentication.

Then, after confirming the subscriber information of the UE, the SMF node performs an additional authentication procedure.

And the SMF node transmits a response message to the UPF node. If additional authentication of the UE fails, the response message may include information on additional authentication failure.

As such, if additional authentication required for the transmission of specific traffic fails, resources in the network may be unnecessarily wasted. In addition, a malicious user who finds such a problem may cause network overload by excessively transmitting traffic requiring additional authentication.

Accordingly, a first disclosure of the present specification is intended to propose a method for enabling a UE having a plurality of network interfaces to effectively determine which interface to send outbound traffic over. In particular, the disclosure herein proposes an effective way to consider SSC mode, slice information, and the like.

A second disclosure of the present specification aims to propose a method for preventing a malicious user from excessively transmitting traffic requiring additional authentication.

The disclosures or embodiments described below may be implemented alone, but a plurality thereof may be implemented in combination with each other.

I. First Disclosure of the Present Specification

Figure 8:
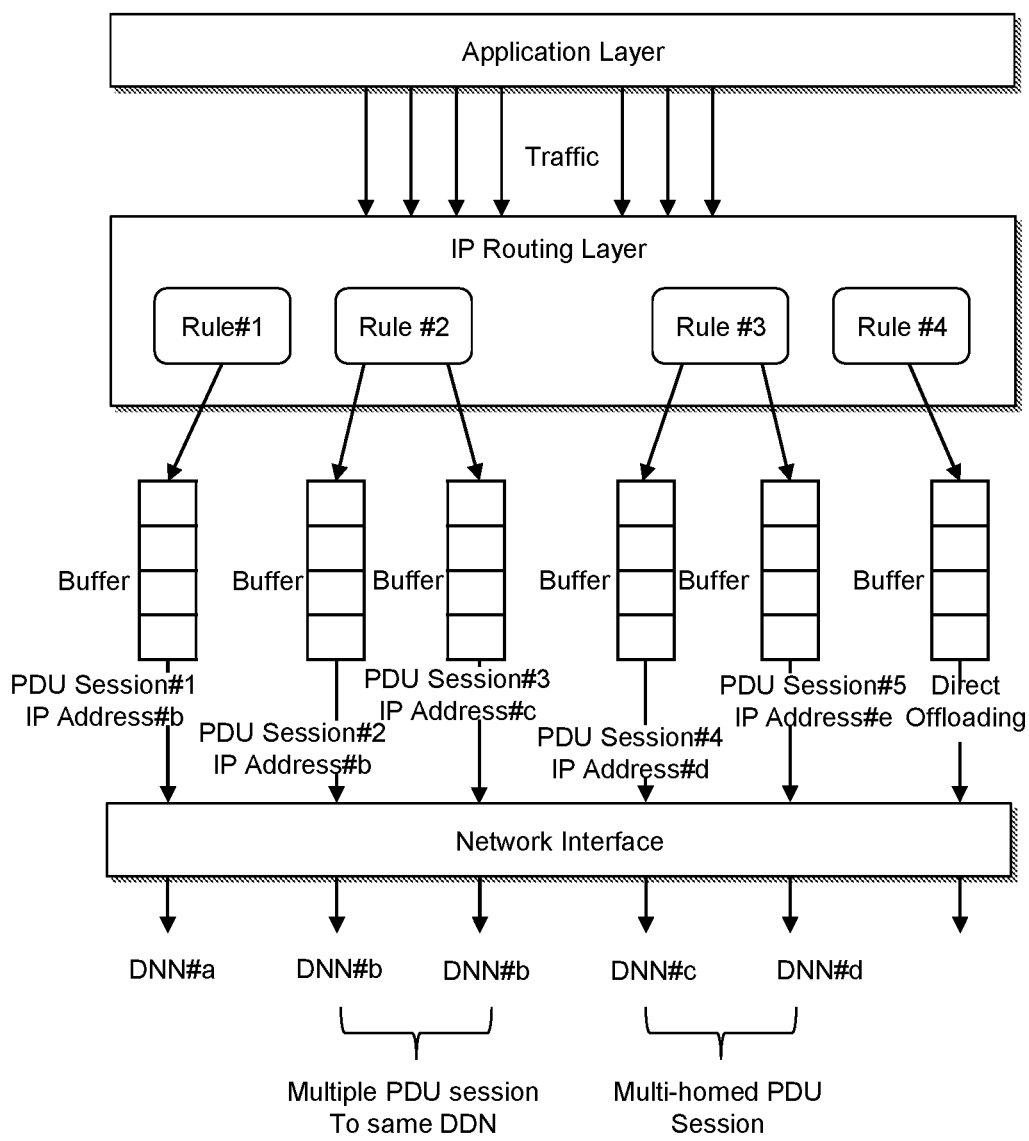
FIG. 8 is an exemplary view conceptually illustrating a first disclosure of the present specification.

FIG. 8 is an exemplary view conceptually illustrating a first disclosure of the present specification.

As can be seen with reference to FIG. 8, upon receiving traffic from the application layer, the IP routing layer determines whether to apply the rule according to the routing rule. The IP routing layer forwards the traffic to a network interface that already has a mapping relationship according to each routing rule. Meanwhile, when there is a PDU session or traffic flow to be newly created according to the routing rule, the IP routing layer creates a new mapping relationship to the corresponding network interface, sets a corresponding buffer, and then transmits the traffic.

The policies and components included in each routing rule are as follows.

A. USRP for Multiple PDU Sessions to the Same DNN

Individual PDU Policy: This policy is used to determine when the UE should request each PDU session to the same DNN. This policy can also be used to determine when to request PDU sessions to the same DNN using different access types. This policy can be added as a component named "Individual PDU" as shown below.

Individual PDU: This indicates whether an individual PDU session toward the same DDN should be established for the matching traffic, or establishment of an individual PDU session is not permitted.

TABLE 2

| | |
|---|---|
| Traffic filter: App = App1, App2 | This URSP rule associates the traffic of applications |
| Individual PDU: shall | "App1" and "App2" with S-NSSAI-a. |
| Slice Info: S-NSSAI-a | It enforces the following routing policy: |
| DNNs: Internet | The traffic of application App1 and the traffic of |
| Access Type: 3GPP Access | application App2 should be transferred on each PDU session supporting S-NSSAI-a. If the PDU session for each traffic filter is not established, the UE shall attempt to establish each PDU session (i.e. one for App1, and another for App2) over Access Type = 3GPP access. |

B. USRP for Multi-Home PDU Sessions

Multi-Home PDU Policy: This policy may be used by the UE to associate its applications with the existing PDU session. In addition, this policy can be used to determine the IP address that the UE should use for specific traffic among the various IP addresses assigned for the PDU session. This policy can be added as a component named "multi-home" as shown below.

Multi-Home: This indicates whether matching traffic should be established with a multi-home PDU session. It may also indicate a traffic filter of associated traffic.

TABLE 3

| | |
|---|---|
| Traffic Filter: App = App1<br>Multi-Home: YES, Traffic filter (App = App2)<br>Slice Information: S-NSSAI-a<br>DNNs: Internet<br>Access Type: 3GPP access<br>Continuity Type: SSC Mode 1 | This URSP rule associates the traffic of applications "App1" with S-NSSAI-a, SSC Mode 1 and the "internet" DNN. In addition, it associated the traffic of applications "App2" for a multi-homed PDU session.<br>It enforces the following routing policy:<br>The traffic of application "App1" should be transferred on a multi-homed PDU session supporting S-NSSAI-a, SSC Mode 1 and DNN = internet using the first IP address of this PDU session. The traffic of application "App2" should be transferred on a multi-homed PDU session supporting S-NSSAI-a, SSC Mode 1 and DNN = internet using the second IP address of this PDU session.<br>If the first prefix traffic of this PDU session is not established, the UE shall attempt to establish the PDU session over Access Type = 3GPP access. |

Meanwhile, priorities may be determined between components as follows.

Each URSP rule may include a traffic filter and a plurality of components arranged according to priority.

TABLE 4

| | |
|---|---|
| Traffic Filter: App = DummyApp<br>Direct Bypass: Permitted (WLAN SSID-a)<br>Continuity Type: SSC Mode 3 | This URSP rule associates the traffic of application "DummyApp" with SSC Mode 3.<br>It enforces the following routing policy:<br>The traffic of application "DummyApp" should be transferred on a PDU session supporting SSC Mode 3. If this PDU session is not established, the traffic can be directly offloaded if the UE is connected to WLAN with SSID-a. If the direct offloaded is not possible, the UE shall attempt to establish the PDU session over any access type. |
| Traffic Filter: App = DummyApp<br>Continuity Type: SSC Mode 3<br>Direct Bypass: Permitted (WLAN SSID-a) | This URSP rule associates the traffic of application "DummyApp" with SSC Mode 3.<br>It enforces the following routing policy:<br>The traffic of application "DummyApp" should be transferred on a PDU session supporting SSC Mode 3. If this PDU session is not established, the UE shall attempt to establish the PDU session over any access type. If the PDU session cannot be established, the traffic can be directly offloaded if the UE is connected to WLAN with SSID-a. |

Meanwhile, in addition to the SSCMSP, NSSP, DNN selection policy, and non-seamless bypass policy as described above, the routing selection policy among the policy information delivered to the UE may additionally include newly proposed individual PDU policy and multi-home PDU policy according to the disclosure of the present specification.

Similarly, among the policy information delivered to the UE, the ANDSF may additionally include a newly proposed individual PDU policy and a multi-home PDU policy in addition to the traffic filter, seamless bypass, slice information, continuity type, DNN, and access type as described above.

II. Second Disclosure of the Present Specification

As mentioned above, the second disclosure of this specification proposes measures to prevent a malicious user from excessively transmitting traffic requiring additional authentication.

Figure 9:
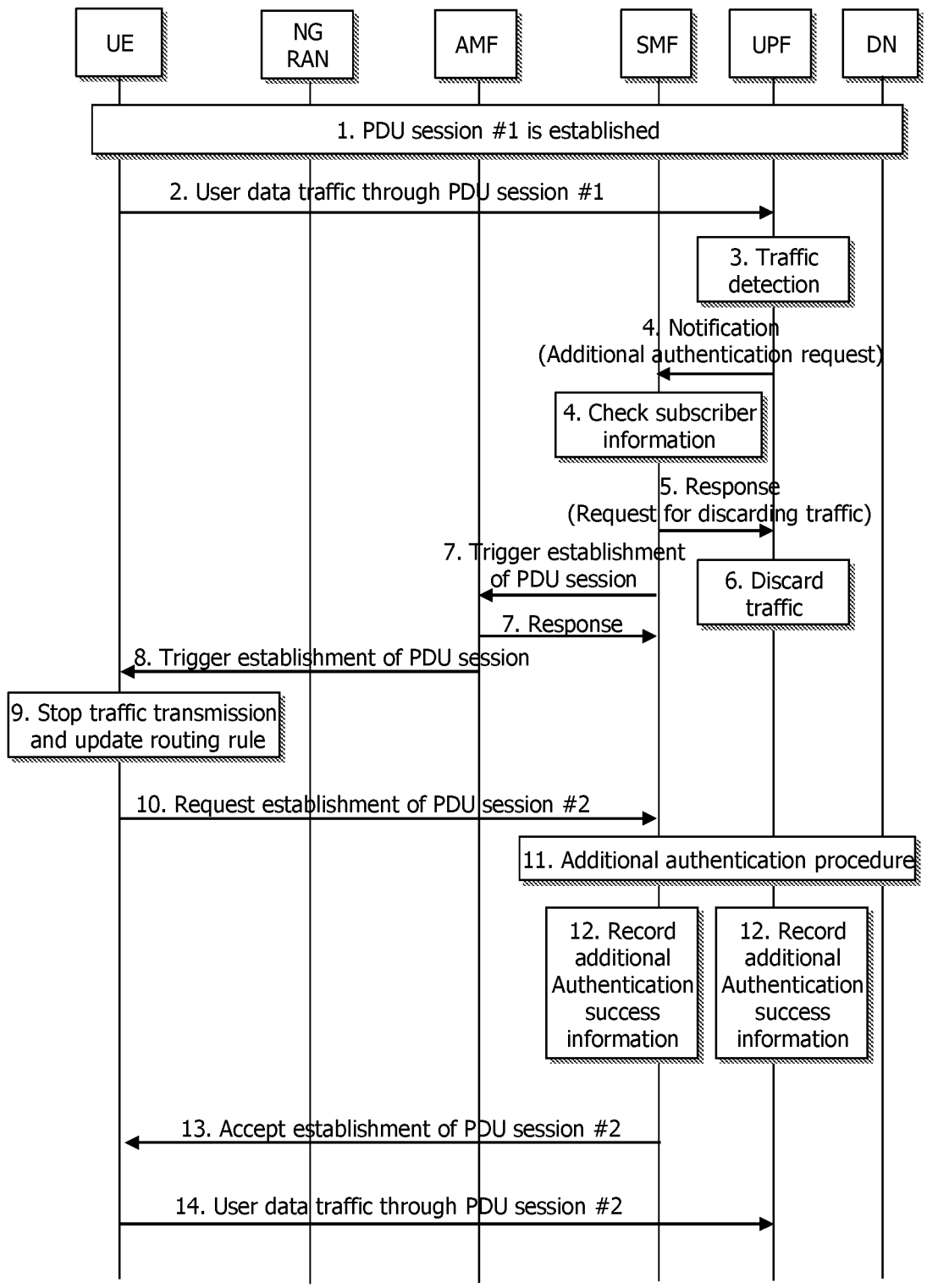
FIG. 9 is a signal flow diagram according to a first scheme of the second disclosure of the present specification.

FIG. 9 is a signal flow diagram according to a first scheme of the second disclosure of the present specification.

According to the first scheme of the second disclosure, when additional authentication fails, the SMF node may request the UPF node to delete the traffic and transmit a trigger message of establishing a PDU session, which includes a request for additional authentication, to the UE. Specifically, it will be described with reference to FIG. 9.

1-2) The UE transmits specific traffic through the PDU session #1 in a state that the PDU session #1 has been established.

3-6) Then, after detecting the traffic, the UPF node analyzes whether the traffic is traffic requiring additional authentication. More specifically, the UPF node analyzes whether the corresponding traffic is traffic requiring additional authentication, based on preset information or policy information provided from the PCF/SMF node. The UPF node then notifies the SMF node of the detection of the specific traffic. The notification may include information indicating a request for further authentication. Then, after confirming the subscriber information of the UE, the SMF node performs an additional authentication procedure. If the additional authentication fails, the SMF node may instruct the UPF node to discard the corresponding traffic.

Alternatively, the UPF node may immediately discard the traffic as soon as it detects the traffic requiring further authentication.

Alternatively, when the UPF node detects traffic, the UPF node may transmit a notification including information on the type of the traffic to the SMF node. The SMF node may determine whether additional authentication is required based on the information on the traffic type included in the notification. If additional authentication is required, after performing additional authentication, the discarding instruction or buffering instruction of the corresponding traffic may be transmitted to the UPF node according to the execution result.

5) The SMF node checks the subscriber information and the completion record for the additional authentication, and decides whether to request the establishment of a new PDU session to the UE.

7) The SMF node requests an Access and Mobility Management Function (AMF) node to send a message for triggering the establishment of a new PDU session, to the UE.

8) The AMF node sends a message to trigger an establishment of a new PDU session to the UE. The message may include information indicating that an additional authentication/authorization procedure is required for specific traffic.

9) The UE stops transmitting the corresponding traffic through the PDU session #1. The UE also updates routing rules related to the transmission of the traffic. That is, the routing rule is updated so that specific traffic is sent through a new PDU session #2.

10) The UE sends an establishment request message to the SMF node in order to establish a new PDU session #2. The PDU session establishment request message may include information necessary for additional authentication.

11-13) The SMF node performs an additional authentication procedure. If the additional authentication procedure is successful, the SMF node and the UPF node record information about the success of the authentication procedure. In addition, the SMF node transmits a message indicating that the establishment of the PDU session #2 is accepted, to the UE.

14) Then, the UE transmits specific traffic through the established PDU session #2.

Figure 10:
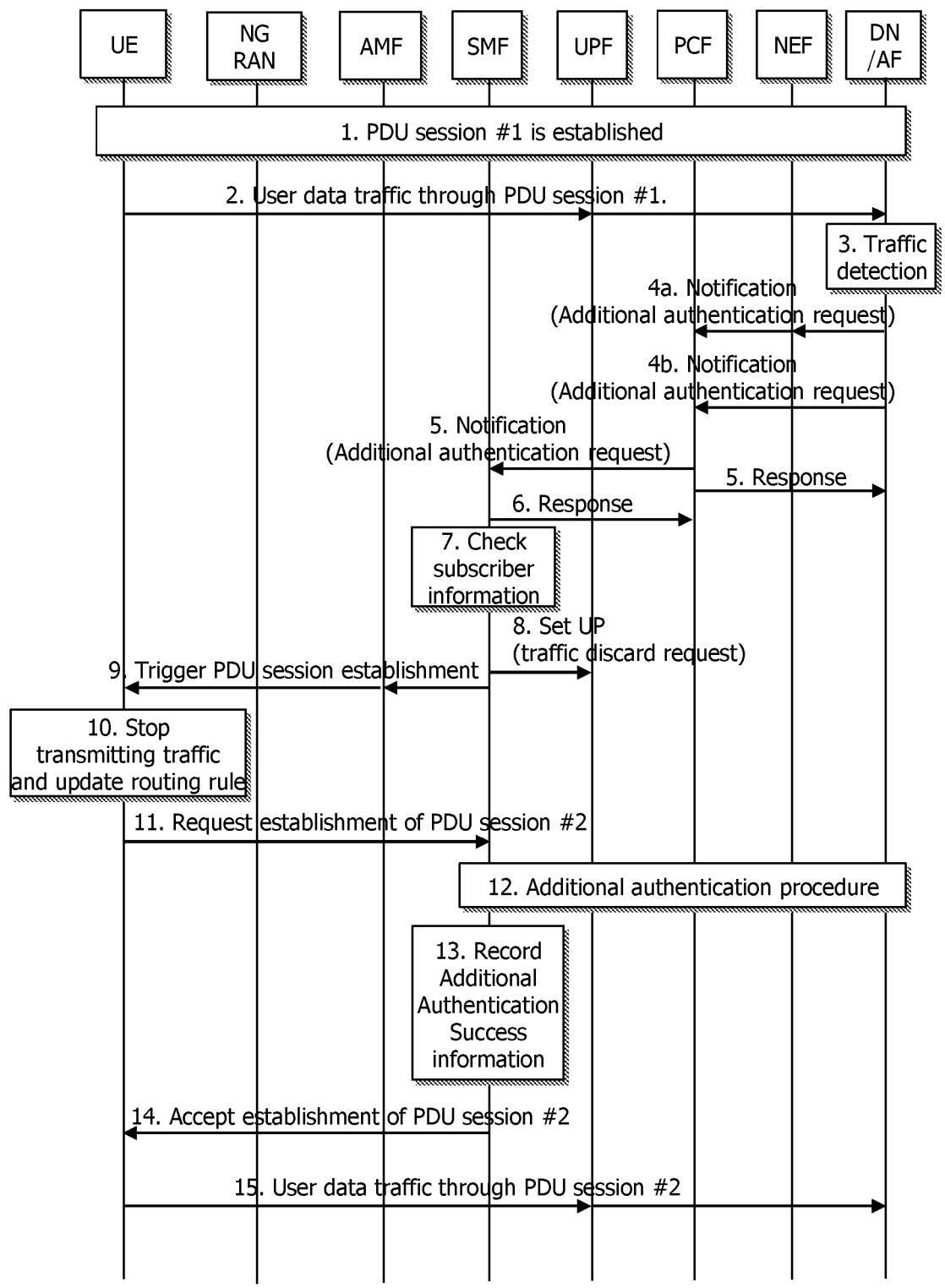
FIG. 10 is a signal flow diagram according to a second scheme of the second disclosure of the present specification.

FIG. 10 is a signal flow diagram according to a second scheme of the second disclosure of the present specification.

According to a second scheme of the second disclosure, if a data network (DN) or application function (AF) node detects traffic, it notifies the PCF node, and the PCF node forwards a notification to the SMF node, to thereby allow an additional authentication procedure to be performed. Specifically, it is as follows.

1-2) The UE transmits specific traffic through the PDU session #1 in a state that the PDU session #1 has been established.

3-6) Then, the data network (DN) or application function (AF) node detects the traffic and then analyzes whether the traffic is traffic requiring further authentication. More specifically, the data network (DN) or application function (AF) node analyzes whether the corresponding traffic is traffic requiring additional authentication, based on preset information or policy information provided from the PCF node. The notification message for detecting the specific traffic is directly transmitted to the PCF node or transmitted to the PCF node through a network exposure function (NEF). The notification may include information indicating a request for further authentication. The PCF node forwards the notification to the SMF node. The PCF node then sends a response message to the notification to the data network (DN) or application function (AF) node.

6-7) The SMF node sends a response message to the PCF node. After checking the subscriber information of the UE, the SMF node determines whether establishment of a new PDU session is required for an additional authentication procedure.

8) The SMF node interacts with the UPF node to set the user plane UP. At this time, since the establishment of a new PDU session has not yet been completed for the additional authentication procedure for a specific traffic, the SMF node may instruct the UPF node to discard the traffic.

9) The SMF node requests the AMF node to send a message for triggering the establishment of a new PDU session, to the UE. The AMF node sends a message for triggering an establishment of a new PDU session, to the UE. The message may include information indicating that an additional authentication/authorization procedure is required for specific traffic.

10) The UE stops transmitting the corresponding traffic through the PDU session #1. The UE also updates routing rules related to the transmission of the traffic. That is, the routing rule is updated so that specific traffic is sent through a new PDU session #2.

11) The UE sends an establishment request message to the SMF node in order to establish a new PDU session #2. The PDU session establishment request message may include information necessary for additional authentication.

12-14) The SMF node delivers information necessary for additional authentication, and performs an authentication/authorization procedure. If the additional authentication procedure is successful, the SMF node records information about the success of the authentication procedure. In addition, the SMF node transmits a message indicating that the establishment of the PDU session #2 is accepted, to the UE.

14-15) Then, the UE transmits specific traffic through the established PDU session #2.

Figure 11:
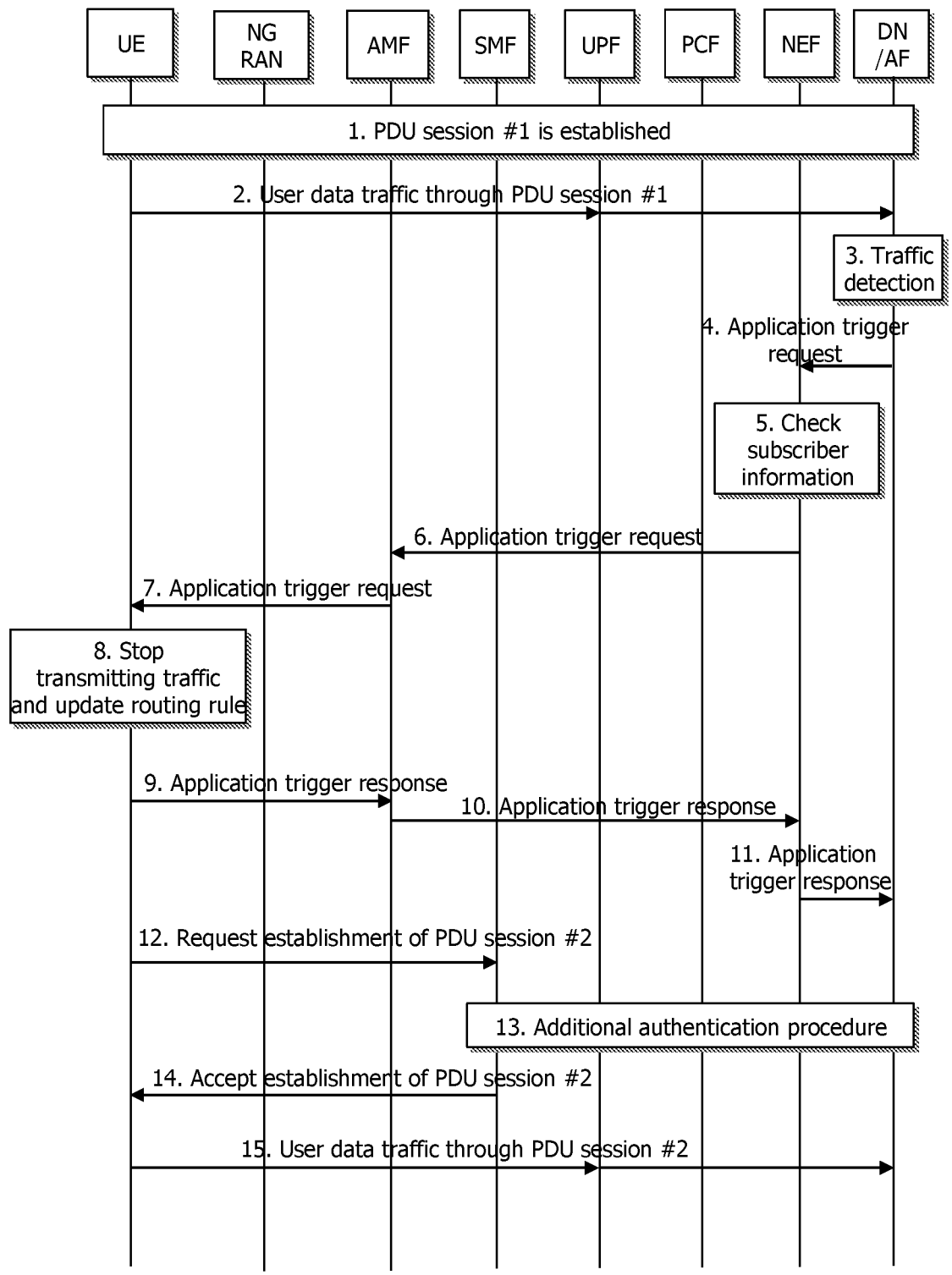
FIG. 11 is a signal flow diagram according to a third scheme of the second disclosure of the present specification.

FIG. 11 is a signal flow diagram according to a third scheme of the second disclosure of the present specification.

According to the third scheme of the second disclosure, when the data network (DN) or application function (AF) node detects traffic, it sends a trigger request to the network exposure function (NEF) node. The trigger request causes the application of the UE to stop sending traffic and to request the creation of a new PDU session for further authentication.

1-2) The UE transmits specific traffic through the PDU session #1 in a state that the PDU session #1 has been established.

3) Then, the data network (DN) or application function (AF) node detects the traffic and then analyzes whether the traffic is traffic requiring further authentication. More specifically, the data network (DN) or application function (AF) node analyzes whether the corresponding traffic is traffic requiring additional authentication, based on preset information or policy information provided from the PCF node.

4) The data network (DN) or application function (AF) node sends an application trigger request message to the NEF node when the additional authentication is required. The trigger request message may implicitly/directly include information indicating that additional authentication is required for the traffic.

5) The NEF node confirms subscriber information. To this end, the NEF node performs interaction with the UDM.

6) The NEF node sends an application trigger request message to the AMF node. In this case, the message may implicitly or directly include information indicating that the additional authentication is required for the traffic.

7) The AMF node sends an application trigger request message to the UE. In this case, the message may implicitly or directly include information indicating that the additional authentication is required for the traffic.

8) The UE stops transmitting the corresponding traffic through the PDU session #1. The UE also updates routing rules related to the transmission of the traffic. That is, the routing rule is updated so that specific traffic is sent through a new PDU session #2.

9-11) The UE sends an application trigger response message to the data network (DN) or application function (AF) node via an AMF node and an NEF node.

12) The UE sends an establishment request message to the SMF node in order to establish a new PDU session #2. The PDU session establishment request message may include information necessary for additional authentication.

13-14) The SMF node delivers information necessary for additional authentication, and performs an authentication/authorization procedure. If the additional authentication procedure is successful, the SMF node records information about the success of the authentication procedure. In addition, the SMF node transmits a message indicating that the establishment of the PDU session #2 is accepted, to the UE.

15) Then, the UE transmits specific traffic through the established PDU session #2.

What has been described so far can be implemented in hardware. This will be described with reference to the drawings.

Figure 12:
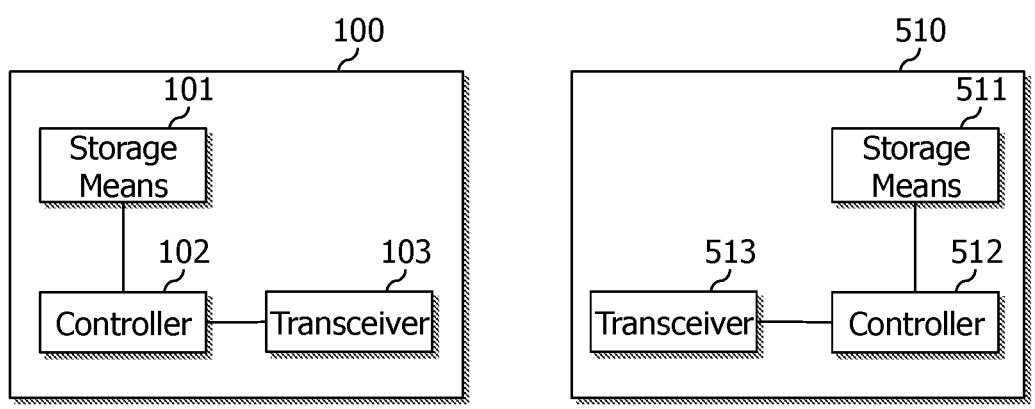
FIG. 12 is a configuration block diagram of a UE and a network node according to an embodiment of the present invention.

FIG. 12 is a configuration block diagram of a UE and a network node according to an embodiment of the present invention.

As shown in FIG. 12, the UE 100 includes a storage unit 101, a controller 102, and a transmission/reception unit 103. The network node may be any one of AMF, SMF, NEF, and AF. The network node includes a storage unit 511, a controller 512, and a transmission/reception unit 513.

The storage means stores the above-described method.

The controllers control the storage means and the transmission/reception units. Specifically, the controllers each execute the methods stored in the storage means. And the controllers transmit the above-described signals through the transmission/reception units.

While the present invention has been described with reference to exemplary embodiments, it is to be understood that the invention is not limited to the disclosed exemplary embodiments, but, on the contrary, can be modified, changed, or improved in various forms within the idea of the present invention and the scope of claims.

What is claimed is:

1. A session management method performed by a session management function (SMF) node, the method comprising:
establishing a first protocol data unit (PDU) session with a wireless device;
receiving a notification related to a traffic transmitted by the wireless device based on the first PDU session,
wherein the notification includes request for additional authentication for the traffic;
determining to establish a second PDU session with the wireless device for the traffic based on i) the request for additional authentication for the traffic and ii) subscription information of the wireless device;
transmitting, to a user plane function (UPF) node, a request message for discarding the traffic, based on determining to establish a second PDU session with the wireless device for the traffic;
transmitting a message for triggering the wireless device to establish the second PDU session, to an access and mobility management function (AMF) node;
receiving a PDU session establishment request message for the second PDU session from the wireless device;
performing a secondary authentication procedure; and
transmitting a PDU session establishment accept message for the second PDU session to the wireless device in response to the PDU session establishment request message.

2. The session management method of claim 1, further comprising:
checking the subscription information of the wireless device based on the notification.

3. The session management method of claim 1, further comprising:
determining whether the secondary authentication procedure is required for the traffic based on the subscription information of the wireless device.

4. A session management function (SMF) node comprising:
a transmission/reception unit; and
a processor configured to control the transmission/reception unit,
wherein the processor is configured to establish a first protocol data unit (PDU) session with a wireless device,
wherein the processor is configured to control the transmission/reception unit to receive a notification related to a traffic transmitted by the wireless device based on the first PDU session,
wherein the notification includes request for additional authentication for the traffic,
wherein the processor is configured to determine to establish a second PDU session with the wireless device for the traffic based on i) the request for additional authentication for the traffic and ii) subscription information of the wireless device,
wherein the processor is configured to control the transmission/reception unit to transmit, to a user plane function (UPF) node, a request message for discarding the traffic, based on determining to establish a second PDU session with the wireless device for the traffic,
wherein the processor is configured to control the transmission/reception unit to transmit a message for triggering the wireless device to establish the second PDU session, to an access and mobility management function (AMF) node,
wherein the processor is configured to control the transmission/reception unit to receive a PDU session establishment request message for the second PDU session from the wireless device,
wherein the processor is configured to perform a secondary authentication procedure,
wherein the processor is configured to control the transmission/reception unit to transmit a PDU session establishment accept message for the second PDU session to the wireless device in response to the PDU session establishment request message.

5. The SMF node of claim 4, wherein the processor is configured to check the subscription information of the wireless device based on the notification.

6. The SMF node of claim 4, wherein the processor is configured to determine whether the secondary authentication is required for the traffic based on the subscription information of the wireless device.

* * * * *